(12) United States Patent
Beukema et al.

(10) Patent No.: US 9,137,070 B2
(45) Date of Patent: Sep. 15, 2015

(54) APPARATUS AND METHOD FOR SIGNAL PHASE CONTROL IN AN INTEGRATED RADIO CIRCUIT

(75) Inventors: Troy James Beukema, Briarcliff Manor, NY (US); Brian Allan Floyd, Mahopac, NY (US); Scott Kevin Reynolds, Amawalk, NY (US); Sergey V. Rylov, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 12/132,022

(22) Filed: Jun. 3, 2008

(65) Prior Publication Data

US 2008/0225990 A1    Sep. 18, 2008

Related U.S. Application Data

(63) Continuation of application No. 11/329,512, filed on Jan. 11, 2006.

(51) Int. Cl.
*H04L 27/00* (2006.01)
*H04L 27/227* (2006.01)

(52) U.S. Cl.
CPC ........ *H04L 27/2273* (2013.01); *H04L 27/0014* (2013.01); *H04L 2027/0057* (2013.01)

(58) Field of Classification Search
USPC ................. 375/145, 375; 714/733, 798, 784
See application file for complete search history.

(56) References Cited

U.S. PATENT DOCUMENTS

| | | | | |
|---|---|---|---|---|
| 3,879,664 A | * | 4/1975 | Monsen | 375/232 |
| 5,150,384 A | * | 9/1992 | Cahill | 375/375 |
| 5,488,631 A | * | 1/1996 | Gold et al. | 375/145 |
| 6,226,509 B1 | | 5/2001 | Mole et al. | |
| 6,334,203 B1 | * | 12/2001 | Inagawa | 714/798 |
| 6,567,480 B1 | | 5/2003 | Brardjanian et al. | |
| 2005/0078743 A1 | | 4/2005 | Shohara | |

FOREIGN PATENT DOCUMENTS

| | | |
|---|---|---|
| EP | 0716518 A2 | 6/1996 |
| GB | 2314981 A | 1/1998 |
| JP | 06-019345 U | 3/1994 |
| JP | 9083959 A | 3/1997 |
| WO | WO9823069 A1 | 5/1998 |
| WO | WO9923756 A1 | 5/1999 |
| WO | WO0041521 A2 | 7/2000 |
| WO | WO0048346 A2 | 8/2000 |

* cited by examiner

*Primary Examiner* — Adolf Dsouza
(74) *Attorney, Agent, or Firm* — Tutunjian & Bitetto, P.C.; Anne V. Dougherty

(57) ABSTRACT

An apparatus and method to control signal phase in a radio device includes a phase rotator configured to control a phase of a local oscillator. A phase error determination module is configured to determine phase error information based on received in-phase (I) and quadrature (Q) (IQ) signal values. A phase correction module is configured to derive from the received IQ signal values a correction signal and apply the correction signal to the phase rotator in a path of the local oscillator.

35 Claims, 7 Drawing Sheets

APPARATUS AND METHOD FOR SIGNAL PHASE CONTROL IN AN INTEGRATED RADIO CIRCUIT

RELATED APPLICATION INFORMATION

This application is a Continuation application of co-pending U.S. patent application Ser. No. 11/329,512 filed on Jan. 11, 2006, incorporated herein by reference in its entirety.

BACKGROUND

1. Technical Field

The present invention relates to signal processing and more particularly to an apparatus and method for providing signal phase control for an integrated radio receiver or transceiver.

2. Description of the Related Art

An example radio transmission system in a context illustrating the need for signal phase control and, in particular, carrier phase recovery in a receiver will be described. A block diagram of a typical radio transmission system 10 is shown in FIG. 1.

Referring to FIG. 1, a binary data stream (data) is modulated by a modulator 12 to In-phase and Quadrature (IQ) baseband signal vectors (I and Q, respectively) using a modulation such as Binary Phase Shift Keying (BPSK) or Quadrature Phase Shift Keying (QPSK). The baseband IQ signals control the sign and amplitude of two orthogonal radio-frequency carrier components, one cosine and one sine carrier. The IQ baseband signals are mixed, or multiplied, in mixers 14 and 16 with the sine and cosine local oscillator signals in a radio transmitter 15 to convert the baseband modulation to a frequency "$f_{TX}$" suitable for propagation over a radio channel. A local oscillator LO provides a base signal that is adjusted by a phase shifter or quadrature divider 18 to provide the sine and cosine local oscillator signals.

The signals are summed by summer 20 and amplified by amplifier 22 to be sent over a radio channel 24 using antenna 26.

In the radio channel, the signal undergoes attenuation, phase shift, and time dispersion. The effect of channel time dispersion, though important in practical systems, is here assumed small enough to be ignored. The channel phase shift may fluctuate as a function of time, t, if there is significant relative motion between the transmitter and receiver or moving reflectors in the radio channel.

In a receiver system 25, the received signal from antenna 28 is amplified by amplifier 30, split and mixed using mixers 32 and 36 and phase shifter/quadrature divider 36 with a local oscillator signal of local oscillator LO to convert the signal back to baseband, providing baseband I and Q signals which are scaled and phase-rotated replicas of the transmitted signal vectors. In a practical radio system, the frequency of the local oscillator LO in the receiver, shown as "$f_{RX}$", will not be identical to the frequency of the local oscillator LO in the transmitter, "$f_{TX}$" This frequency error adds a time varying phase error to the received signal, resulting in a typical rotation of the received I/Q signals around the complex plane at a rate proportional to the difference in frequency between the transmit and receive local oscillators.

This phase rotation presents a problem for the receiver when coherent baseband modulation is used. Coherent baseband modulation, by definition, requires that the phase error of the channel be removed prior to demodulation of the received I and Q signals to an estimate of the transmitted binary information.

A specific example of a common modulation which is sensitive to channel phase error is binary phase-shift keying (BPSK). In this system, binary information might be encoded to a modulation value "+1" for a transmitted data bit value of 1 and a modulation value "−1" for a transmitted data bit value of 0. Due to phase rotation in the channel, the received signal may be rotated by an arbitrary amount, so that the "+1" value shows up at an arbitrary rotated angle from −180 to +180 degrees, preventing proper decoding of the received information unless the phase rotation is corrected. Further, due to frequency error, the phase of the received signal varies with time.

One common method to circumvent the phase error in a radio system is to use non-coherent baseband modulation systems. In this type of modulation, the carrier phase does not need to be recovered in the receiver. The phase error in a typical DBPSK, or Differential Binary Phase-Shift Keyed, non-coherent receiver is removed by subtracting the phase of a previously received symbol from the phase of a currently received symbol. Under the assumption that the channel phase is the same or approximately the same for the two closely spaced channel symbols, the phase error subtracts out, and a decision can be made if the angle between two successive symbols is 0 or 180 degrees.

This detection method, combined with differential data encoding, provides a radio system capable of transmitting information without the need for explicit carrier recovery. Both DBPSK and Differential Quadrature Phase-Shift-Key (DQPSK), which encodes pairs of data bits to a differential phase rotation of 0, 90, −90, or 180 degrees, are examples of non-coherent modulation systems.

The coherent detection of BPSK and QPSK may be advantageous, since coherent detection typically removes 3 dB of noise penalty in the decoder. This noise penalty arises, since subtraction of the phase between two successive symbols multiples the RMS value of the channel phase noise by 1.414, or 3 dB. In addition to sensitivity improvement, coherent detection can make the receiver data demodulator very simple, since all that is needed to decode received symbols is a threshold compared against zero (sometimes called a data slicer) on the I or I and Q outputs of the radio receiver.

This feature enables a radio with IQ channel outputs to connect directly to a high-speed clock-and-data recovery (CDR) device which is commonly used in high-speed I/O Serializer/Deserializer (SerDes) systems to provide multiple-Gb data signals for inter-chip communications. Combined with a 60 GHz radio with carrier phase recovery, these high-speed CDRs/SerDes provide the potential of realizing efficient multiple-Gb 60 GHz wireless data transmission systems.

FIG. 2 shows a well-known method used to find the phase of a BPSK signal in an analog demodulation system 70 including a "Costas" loop 50. The Costas loop 50 is based on a product detector which integrates the frequency of a voltage-controlled oscillator (VCO) to lock the demodulated output to the transmitted channel phase. The receiver outputs I and Q to clock-data-recovery (CDR) circuits 52 and decodes the recovered data using a decoder 54. Using low pass filters 56, the I and Q outputs from receiver 25 are mixed in the Costas loop 50 by mixer 58. The Costas loop 50 includes a loop integrator comprising amplifier 60 and a capacitor 62 to generate a filtered control voltage for the voltage-controlled oscillator.

The Costas loop 50 has several disadvantages for use with an integrated radio IC architecture: 1) it requires an analog VCO, which can potentially consume large amounts of power and die area, in addition to adding un-wanted phase noise to the received signal, 2) it has the potential of false-lock, 3) the lock time of the Costas loop system may be excessive for high-speed time-division multiplex (TDM) based physical-layer (PHY) protocols which are typically used in high-speed wireless data transmission systems, and 4) although the Costas loop 50 can be configured to lock to a QPSK signal, the complexity increase is significant.

Referring to FIG. 3, a second common method used in digital receiver systems to realize coherent detection is to employ analog to digital (A/D) converters 72 to convert the received analog signal (typically the baseband I and Q signals) to digital values and employ a digital signal processor 74 to run digital-signal processing algorithms to acquire to the channel phase and subtract it from the received data symbols prior to making bit decisions.

This approach can address all four disadvantages of the analog Costas loop: the analog VCO is replaced with numerical computations done in the digital domain, false-lock can be detected and corrected using numerical algorithms, lock time can be very fast since no analog settling transients are involved, and demodulation of QPSK or other more complex modulation formats can also be addressed using appropriate digital algorithms well known in the art with minimal increase in analog system complexity.

The introduction of the A/D and digital baseband processing brings its own disadvantages, however, for extremely high data rate systems. The main disadvantage is the need for high speed A/D converters and correspondingly fast digital-signal processing logic for high data (multiple Gb/s) data rates. As an example, a 1 Gsym/sec data transmission system produces 1 Gb/s for BPSK and 2 Gb/s for QPSK and requires two 2 Gsample/sec A/D converters.

These high rate converters and associated digital signal processing logic can increase the complexity and power of the demodulation system significantly compared to a CDR data-slicer based I/O core running at comparable data rates.

SUMMARY

An apparatus and method to control signal phase in a radio device includes a phase rotator configured to control a phase of a local oscillator. A phase error determination module is configured to determine phase error information based on received in-phase (I) and quadrature (Q) (IQ) signal values. A phase correction module is configured to derive from the received IQ signal values a correction signal and apply the correction signal to the phase rotator in a path of the local oscillator.

A method for controlling phase in a radio device includes controlling phase of a local oscillator in a radio device using a digitally controlled analog phase rotator and enabling adjustment of the phase of the phase rotator by one or more of an automatic circuit or an external interface. Phase error information is determined based on received in-phase and quadrature phase (IQ) signal values. A phase correction signal derived from the received IQ signal values is applied to a phase rotator device in a local oscillator path of the radio device.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
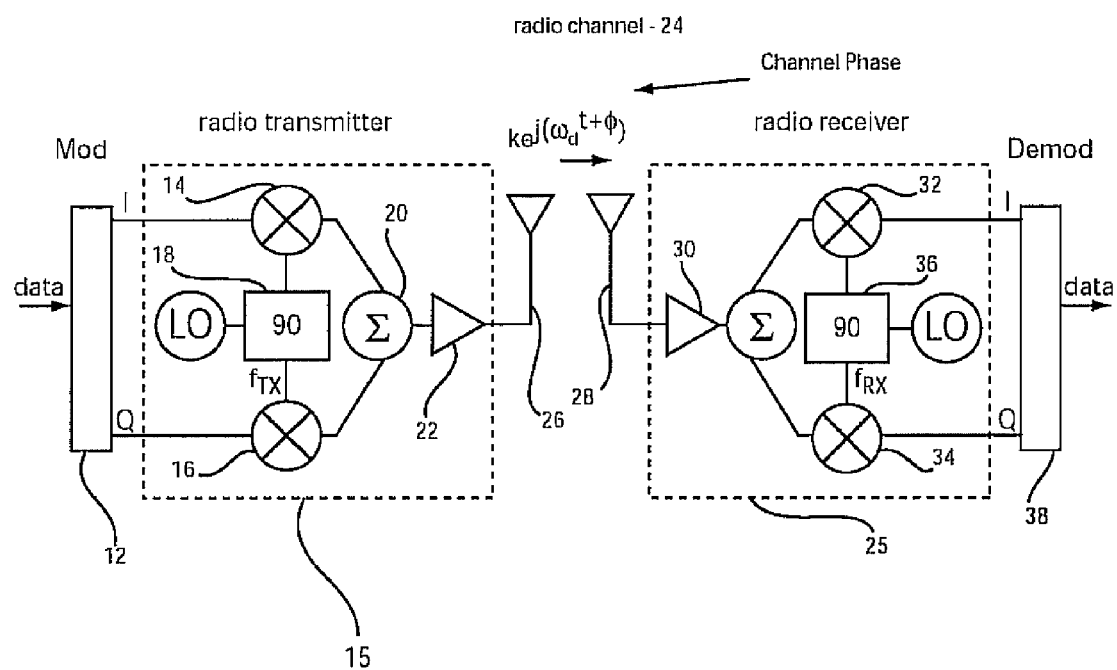
FIG. 1 is a digital radio transmission system in accordance with the prior art.
Figure 2:
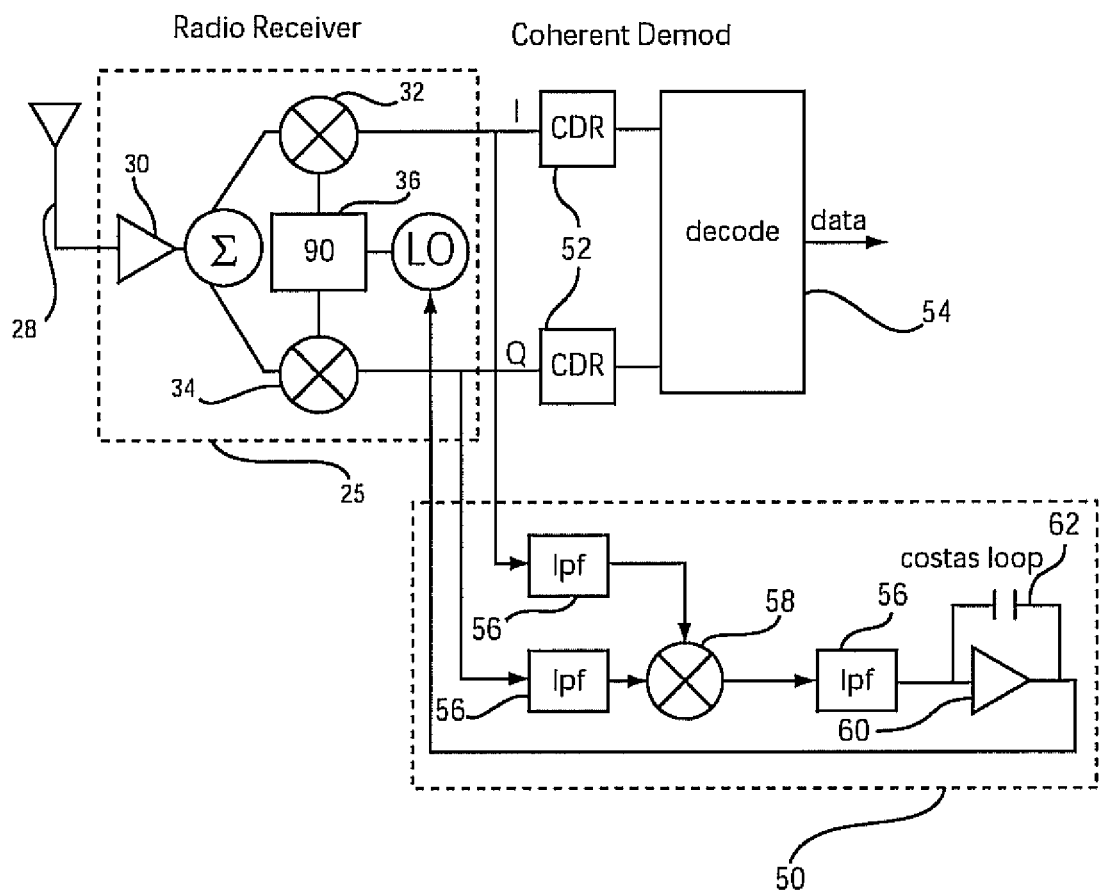
FIG. 2 is an analog phase coherent receiver system using a Costas loop in accordance with the prior art.
Figure 3:
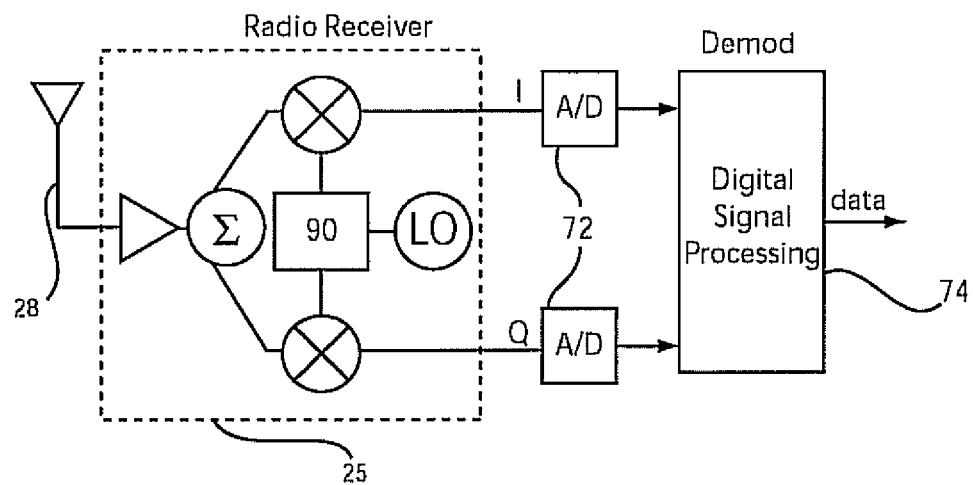
FIG. 3 is a coherent demodulation system using a analog to digital conversion and digital signal processing (DSP) in accordance with the prior art.

A method and apparatus for providing signal phase control in a receiver, for example, an integrated radio receiver, is described. The present embodiments make use of a digitally controlled analog phase rotator which is used to adjust the phase of a local oscillator in the radio. The method of phase control is combined with a digital phase detection method based on, e.g., octant detection needing only four 1-bit analog/digital (A/D) decisions to enable rapid carrier phase recovery in a high-speed data receiver for coherent demodulation of binary phase-shift keyed (BPSK) or quadrature phase-shift keyed (QPSK) modulation.

Coherent phase recovery, in turn, enables directly interfacing a broadband integrated (e.g., 60 GHz) transceiver to multi-Gb/s analog serializer/deserializers (SERDES) to realize high-speed wireless data systems without the need for high speed, high-precision D/A and A/D. The phase control capability provided also enables adjustment of both transmit and receive phase for application in phased-array radio systems. The phase control method is suited for integration on a radio integrated circuit (IC) with low digital/analog die area and power requirements.

Embodiments of the present invention can take the form of an entirely hardware embodiment, an entirely software embodiment or an embodiment including both hardware and software elements. In a preferred embodiment, the present invention is implemented in hardware, which includes but is not limited to integrated circuits, printed wiring boards, wired circuits, etc. The circuit or circuits may include software which in turn may include firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described herein may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The apparatus/method as described herein may be used in integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The present invention will be illustratively described in terms of an integrated radio IC using at least one mixer element with at least one local oscillator signal feeding the mixer element. A digitally controlled analog phase rotator is used to control the phase of the signal input to the radio mixer element. However, the present invention is much broader and is applicable to any transceiver environment.

Figure 4:
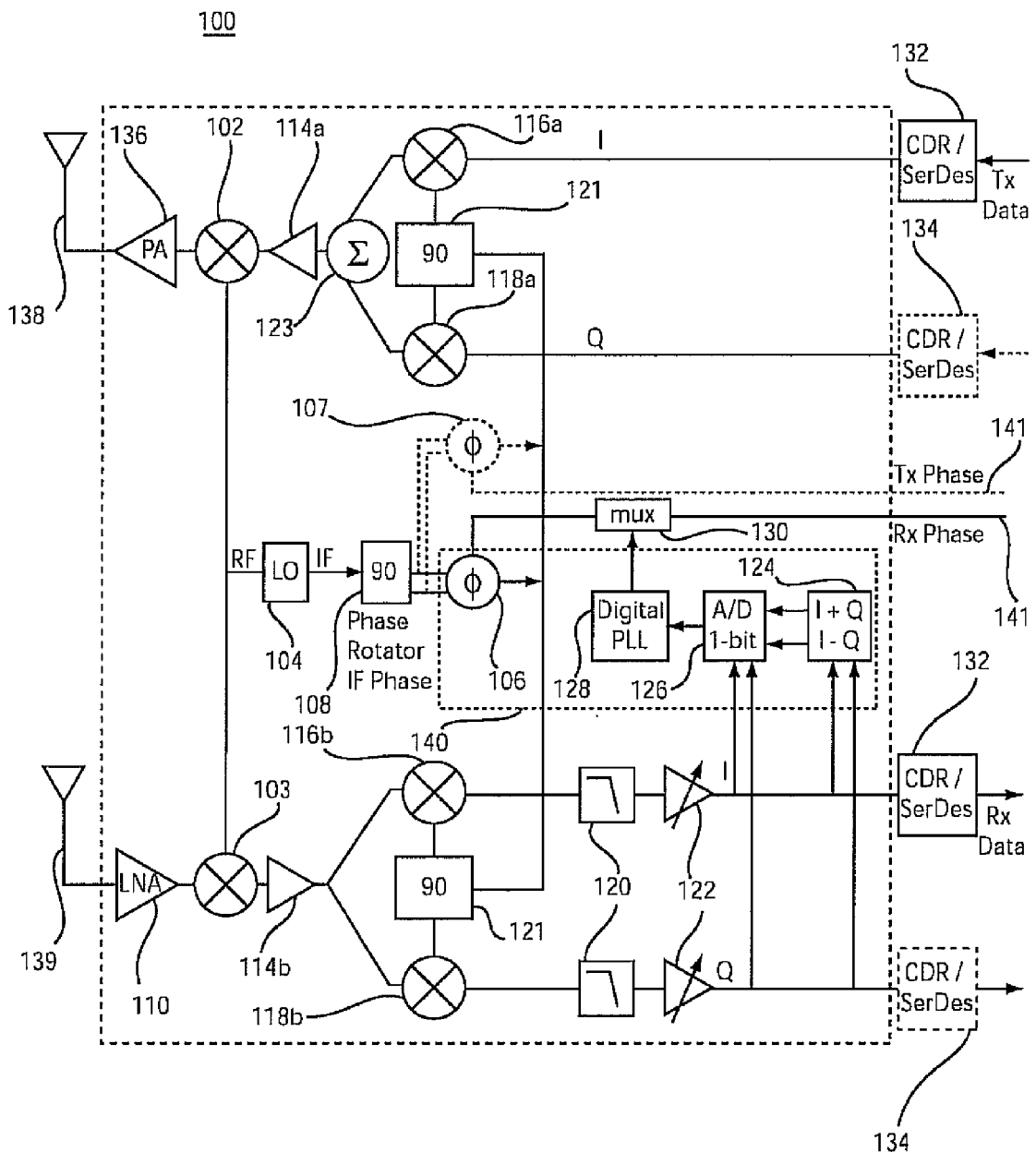
FIG. 4 is a schematic diagram showing an illustrative signal phase control circuit for an integrated radio transceiver in accordance with one exemplary embodiment of the present invention.

Referring now to the drawings in which like numerals represent the same or similar elements and initially to FIG. 4, a radio transceiver 100 is based on a super-heterodyne architecture which employs first conversion mixers 102/103 preferably at an intermediate frequency (IF). A local oscillator (LO) 104 is provided with the signal normally connected to the LO ports of the second conversion quadrature mixers 116a and 116b and 118a and 118b instead sent to the input of an analog phase rotator 106 through quadrature generator 108, which may be realized as a quadrature divider or a 90 degree phase shifter using methods well established in the art. The analog phase rotator 106 needs quadrature (IQ) inputs, which are normally directly available in a quadrature downconversion architecture.

The phase rotator 106 combines the IQ LO signals to produce a LO signal with digitally selectable phase, enabling 360 degree phase control of a receive and/or transmit signal. The digitally selectable phase may be selected or provided from on or off chip (from bus 141 labeled Tx Phase and/or Rx Phase for respective off-chip control signals). As illustrated for the receive portion, Rx Phase may be input from off-chip or determined using an on-chip digital carrier recovery loop 140.

For the transmission portion, transmission data (Tx Data) is input from the transmit or serializer section of serializer/deserializers (SerDes) 132 and 134 corresponding to I and Q, respectively. Output from rotator 106 (or 107 in the case a separate phase rotator is used for transmit and receive) is provided to quadrature phase generators 121 and mixed with I and Q signals using mixers 116a and 118a respectively to provide quadrature upconversion and downconversion. On the transmission side, the mixed I and Q signals are summed by summer 123 and amplified by amplifier 114a, and output to second stage mixer 102 which converts the signal to the desired carrier frequency. The signal from mixer 102 is amplified by a power amplifier 136 to transmit the signal using antenna 138.

A single phase rotator 106 may control the receiver and transmitter phase together in a time-division multiplex design where either only transmitter or only receiver is active, or independent phase rotators may be used on transmit and receive paths (e.g., a rotator 107 may be employed for transmit path and 106 for the receive path). Alternately, external independent controls may be employed on bus 141. In systems which do not need phase control of the transmitter, but only phase control in the receiver to realize carrier recovery loops, the phase rotator 106 is only needed in the receive path.

On the receive side, a signal is received by antenna 139 and amplified using a low noise amplifier 110 and input to first conversion mixer 103. After mixing, the signal is amplified by tuned IF amplifier 114b and split to mixers 116b and 118b (for I and Q respectively) for quadrature downconversion. The I and Q signals are filtered by filters 120 and amplified by baseband variable gain amplifiers (VGA) 122. The output of baseband amplifiers 122 is sent directly to CDR/SerDes 132 and 134 which produce received data (Rx Data) in accordance with the benefits of the present invention.

The outputs of baseband amplifiers 122 are employed in the digital carrier recovery loop 140. Loop 140 includes a module 124 that sums and takes a difference between I and Q signals, and inputs the sum and difference to an analog to digital converter 126 which converts the analog sum, difference, I and Q signals to digital signals, which in a preferred embodiment are one-bit digital signals based on the signs of the sum, difference, I and Q signals. The four output bits from the comparisons are sent to a digital phase locked loop 128 to provide a phase adjustment for carrier recovery. Further description of the digital carrier recovery loop 140 will be provided below.

Figure 5:
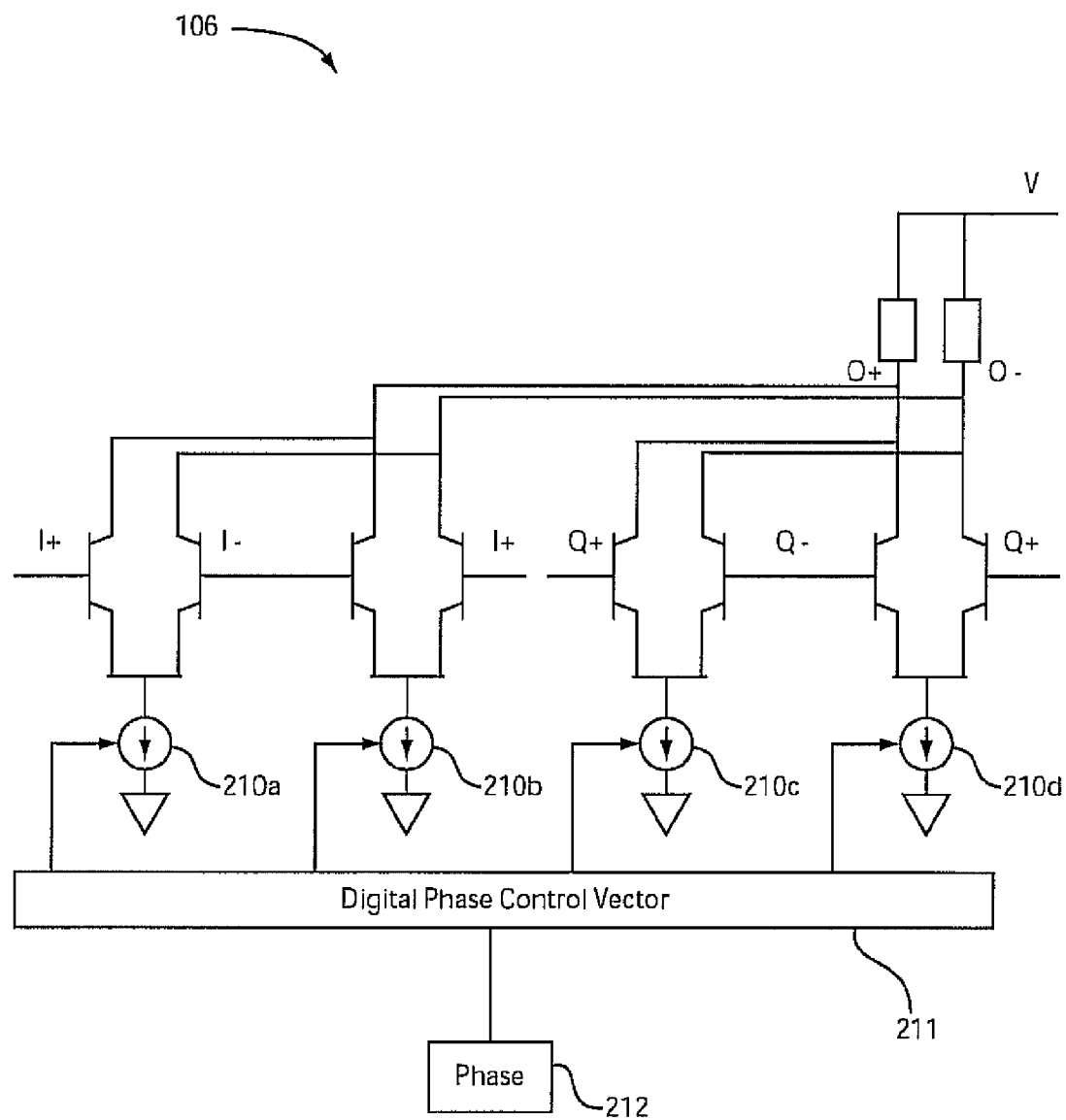
FIG. 5 is a schematic diagram showing a digitally controlled analog phase rotator useful in illustrative embodiments of the present invention.

Referring to FIG. 5, a digitally controlled analog phase rotator 106 is shown for use in a receiver or transceiver. The analog phase rotator 106 accepts differential I and Q inputs, where the I and Q signals represent signals, which in a preferred embodiment are sinusoidal, but may also be realized as sinusoidal approximations such as a lowpass filtered or otherwise slew-rate limited square wave, separated in phase by 90 degrees. Each differential input is connected to two differential pairs, whose outputs are summed together. Digital adjustment of tail currents 210a, 210b, 210c, and 210d of the differential pairs enables the I and Q inputs to be independently adjusted in amplitude and sign, from −I to +I and from −Q to +Q. This enables a four quadrant (360 degree) phase coverage for the output (phase 212) of the rotator 106. A digital input phase value (digital phase control vector 211) is decoded to the necessary differential-pair tail current weights to provide a phase control from 0 to 360 degrees. A resolution for the phase rotator may be, for example, 64 steps around a full 360 degree rotation, providing approximately 6 degree per step phase resolution. This resolution is adequate for both BPSK and QPSK coherent phase recovery.

A phase control update rate for the phase rotator 106 in a preferred embodiment of an integrated 60 GHz broadband transceiver may be between about 500 Ms/sec to 800 Ms/sec. This update rate is sufficient to enable the phase rotator 106 to track +/−100 ppm offset at 60 GHz while not requiring any sequential step updates of the phase rotator 106 to exceed one step. A 100 ppm offset at 60 GHz corresponds to 6 MHz phase rotation.

In one embodiment (shown in FIG. 6) of a super-heterodyne radio architecture with quadrature IF phase rotators at approximately 9 GHz, the 9 GHz IF signal will be 6 MHz off in frequency due to 100 ppm frequency error, and should be compensated by adjusting the phase rotator phase. In one example, since one step of the phase rotator moves approximately 1/64 cycle, an update rate of 500 MHz enables the phase rotator to move at 500 MHz/64 or 7.8 MHz maximum without requiring double-steps of the rotator. If double-steps are used, the maximum cyclic frequency achievable by the rotator is 15.6 MHz at IF. Both of these frequencies cover a maximum +/−100 ppm total system frequency error.

In another embodiment (shown in FIG. 7), a super-heterodyne radio architecture with single IF phase rotator at 18 GHz is shown. In a preferred embodiment, the phase rotator steps are reduced to 32 per unit circle, to realize approximately 12 degrees phase movement per step at 18 GHz and 6 degrees phase movement per step after quadrature divide to the IF frequency of 9 GHz. The frequency coverage is then 6.8 MHz and 15.6 MHz for single and double rotator steps, respectively, which is the same as that achieved using a phase rotator implemented at the IF frequency of 9 GHz with 64 steps. The single IF phase rotator realized at 18 GHz reduces the complexity of the phase control (requiring only 32 steps vs. 64 steps) and eliminates the need for analog quadrature generation at the IF frequency since the quadrature IF signals can be generated directly from a quadrature divide off the 18 GHz output signal. However, the 18 GHz phase rotator requires higher performance differential pairs which can operate at 18 GHz and a quadrature generation network to provide quadrature signals to the input of the phase rotator.

A single IF phase rotator may alternately be employed at 9 GHz IF frequency, used in conjunction with a quadrature generation network (FIG. 6) to produce the needed I/Q signals for the quadrature down-converter.

Figure 6:
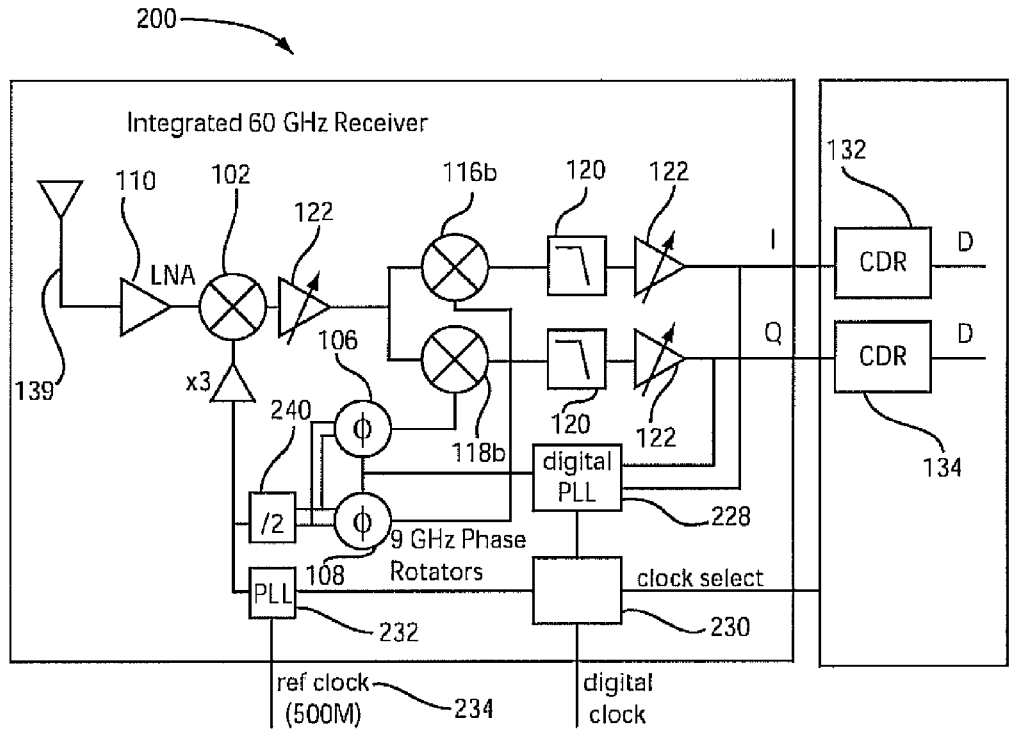
FIG. 6 is a schematic diagram showing an illustrative embodiment for an automatic phase recovery system having a quadrature phase IF rotator system for a receiver with an integrated (on-chip) digital phase locked loop in accordance with one exemplary embodiment of the present invention.
Figure 7:
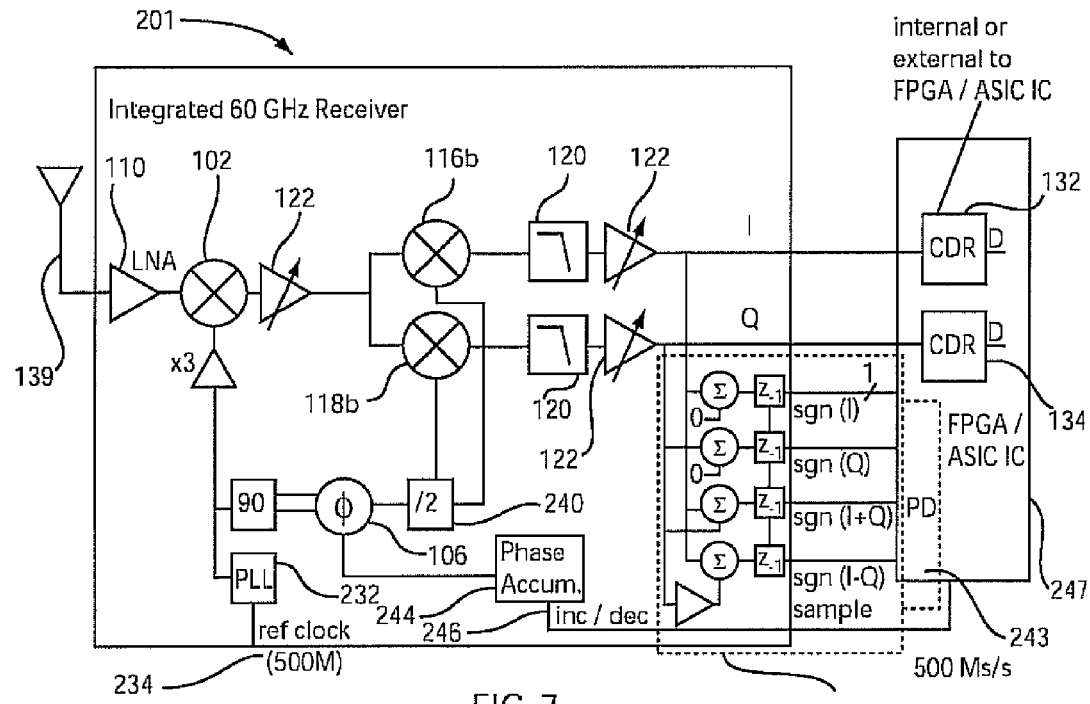
FIG. 7 is a schematic diagram showing an illustrative embodiment for an automatic phase recovery system having a single phase IF rotator system for a receiver with an external (off-chip) digital phase locked loop in accordance with one exemplary embodiment of the present invention.

The differential pairs in the phase rotator are designed to work at the frequency of the IF for a quadrature rotator system as shown in FIG. 6, or at double the frequency of the IF for a single rotator system as shown in FIG. 7. This corresponds to 9 GHz and 18 GHz in the preferred 60 GHz radio architectures. Both of these frequencies are achievable by high-performance SiGe transistors used to realize a preferred embodiment of an integrated 60 GHz radio design. The present invention is not limited to the described frequencies of operation and rates or material of construction; other frequencies and materials are also contemplated.

Referring to FIG. 6, one embodiment of a receiver system 200 using phase rotators 106 to realize carrier recovery is illustratively shown. Two analog phase rotators 106 receive a signal divided by divider 240 and are used to produce in-phase and quadrature (I and Q) LO signals, enabling digital 360 degree phase control for both transmit (not shown) and receive paths.

A digital PLL 228 which may be clocked from an internal reference clock frequency 232 or an external digital clock 230 derives phase error from the baseband IQ signals and outputs digital phase control information to phase rotators 106 to adjust the phase of the I and Q signals to minimize recovered phase error. A PLL 232 is also employed to create a high spectral purity local oscillator signal which is locked a reference clock input 234.

Referring to FIG. 7, in another embodiment, a system 201 includes a single phase rotator 106 which is inserted prior to a divider 240 which provides quadrature LO signals for the IQ downconverter. The present invention may also be applied to direct-conversion radio architectures by controlling the phase of the local oscillator, however, the super-heterodyne architecture is preferred for a 60 GHz integrated transceiver since the IF frequency can be made low enough (e.g., 9 GHz in one embodiment) to realize a practical, low power analog phase rotator.

An IQ octant driven phase-recovery module 243 (similar or equivalent to PLL 128) may be combined with the IF phase rotator circuitry to enable realization of a digital PLL which automatically adjusts the phase of the phase rotator 106 to track out frequency and phase error in a radio receiver system using either BPSK or QPSK modulation. Module 243 will be described in greater detail with reference to FIG. B. As a result of the operations of module 243 and other off-chip operations performed by e.g., an application specific integrated circuit chip 247, the sign of the I, Q, I+Q, and I−Q signals are processed to determine phase and frequency adjustments. An increment or decrement signal is provided to a phase accumulator 244 integrated on the transceiver IC to make adjustments to the phase rotator 106. An A/D converter 245 creates digital inputs to a phase detector/phase lock algorithm 242 (FIG. 8) based on the signs of the I, Q, I+Q and I−Q parameters.

Figure 8:
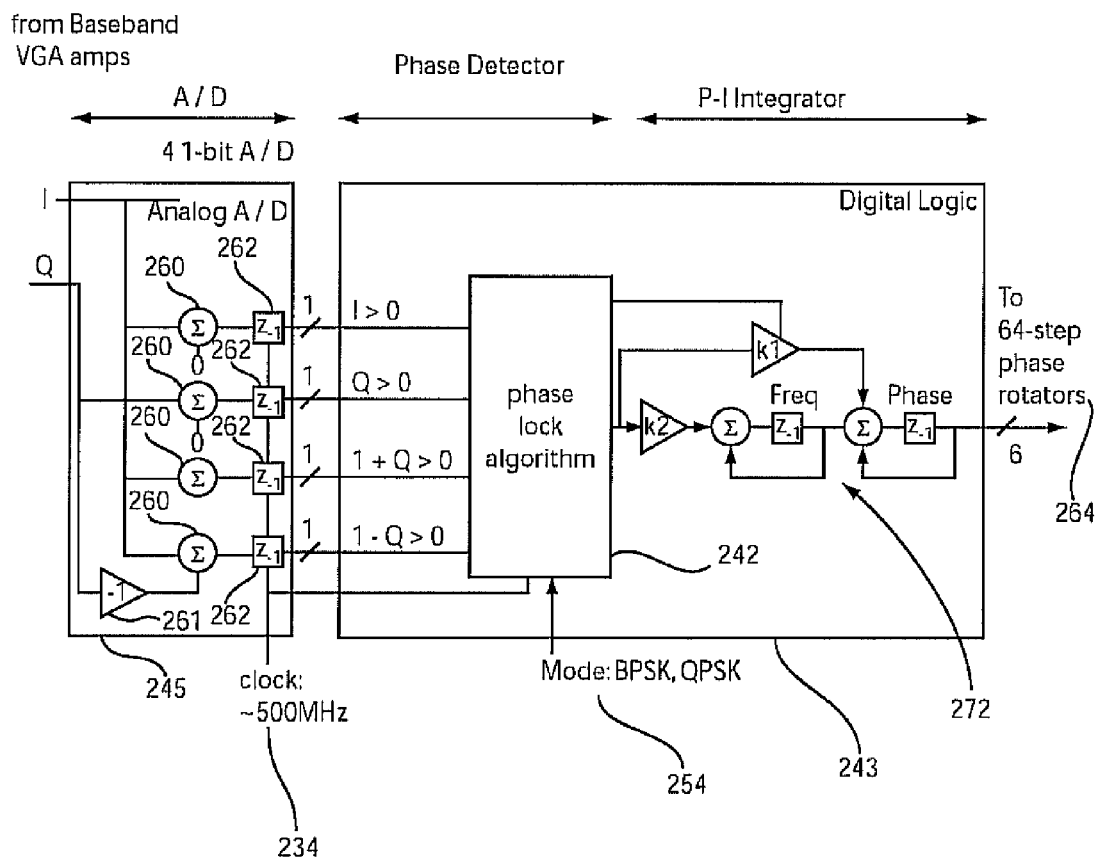
FIG. 8 is a schematic diagram showing an illustrative embodiment for a digital carrier recovery loop with an IQ octant phase selector in accordance with one exemplary embodiment of the present invention.

Referring to FIG. 8, detailed components of a digital carrier recovery loop 140 as diagrammed in FIG. 4 are illustratively shown. Loop 140 (FIG. 4) includes an IQ octant driven phase-recovery module 243 (also referred to as Digital PLL 128 in FIG. 4) which may be used with an IF phase rotator system (FIGS. 4, 6 and/or 7) to enable realization of a phase control loop which automatically adjusts the phase of the phase rotator to track out frequency and phase error in a radio receiver system using, e.g., BPSK or QPSK modulation.

An analog to digital (A/D) converter 245 includes I and Q as inputs from baseband VGAs 122 (FIG. 4) and uses summers 260 to add zero to I and zero to Q, add I+Q and subtract I−Q (diagrammed here using an inverter 261 to invert the sign of Q in combination with a summer). Using A/D converters 262, which in a preferred embodiment comprise high sensitivity binary detection latches, signs are determined for the output of summers 260, e.g., a digital "1" is output for a positive result and a digital "0" for a negative result. These signs are input to digital phase detector 242 which employs logic and/or a state machine to determine phase correction settings for the phase rotator.

The phase detector/module 242 has as input four 1-bit signs from baseband I, Q, I+Q, and I−Q analog signals and in a preferred embodiment these signs are processed using any appropriate phase detection algorithm or method capable of deriving an appropriate phase advance/retard signal to drive a digital second-order integrator loop 272 to realize zero steady state phase error for a constant frequency offset. Coherent demodulation is therefore provided without the need for analog Costas loop/VCO or high-speed/high-precision A/D converters systems. This enables a broad-band radio (e.g., 60 GHz) to interface directly to high-speed (multi-Gb) analog SERDES I/O cores (132 and 134 in FIGS. 4, 6 and 7).

As mentioned, the I/Q phase detector module 242 accepts four 1-bit signals from the received I/Q data (sgn(I), sgn(Q), sgn(I+Q) and sgn(I−Q)). The algorithm/module 242 outputs a phase correction value which is used to maintain phase coherence with a BPSK or QPSK received signal. The phase detector module in a preferred embodiment may be configured for BPSK or QPSK operation using mode select control 254. In a preferred embodiment, the phase rotator 106 will have 64 steps for 360 degree rotation if implemented at an IF frequency or 32 steps for 360 degree rotation if implemented at 2× IF frequency. The phase setting of the rotator may be controlled by an increment/decrement line 246 through an external interface to the radio IC 201 shown in FIG. 7, or directly controlled by a twos-complement coded 5 or 6-bit control vector 264 for 32 step or 64 step phase rotators, respectively, from the IQ phase recovery module 243 if the digital logic is integrated on chip.

The digital PLL is realized using the phase detection module 242 which processes the sign information available from the 1-bit decisions I>0, Q>0, (I+Q)>0, and (I−Q)>0. The phase detector produces either a phase-advance or phase-retard signal which is sent to digital proportional-integral (PI) path loop integrator 272. This type of loop integrator is known in the art. It is a second-order integrator which enables tracking a fixed frequency offset with no steady-state phase error. The frequency state variable locks to the frequency difference between the transmitter and receiver, and the phase state variable locks to the phase difference. The P-I integrator and phase lock algorithm (243) in a preferred embodiment are updated at the rotator step rate, which in a preferred embodiment is between 500 Ms/s and 800 Ms/s.

The present invention enables digital phase control of a radio transceiver's transmit and receive paths without needing D/A of IQ samples at transmitter or A/D of IQ samples at receiver, which may be useful in phased-array antenna systems applications.

Functionality provided by the present invention includes, among other things:

1) Rapid fully integrated carrier phase recovery for multi-Gb BPSK/QPSK modulation which may be used in broadband (60 GHz) radio systems.

2) Directly interfacing a broadband IQ demodulator to high-speed clock-and-data recovery (CDR) devices without the need for high-speed, high precision A/D and D/A converters.

3) Carrier phase control for use in phased arrays with no RF/IF/baseband data-path phase shifters, and no digital A/D and D/A.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An apparatus to control signal phase in a radio device, comprising:
a digitally controlled analog phase rotator, driven by a local oscillator, that accepts differential in-phase (I) and quadrature (Q) (IQ) inputs, connected in two differential pairs, that is configured to control a phase of the local oscillator's output, wherein there is no digital-to-analog converter in a path of the analog phase rotator and the local oscillator;
a phase error determination module configured to determine phase error information based on received I and Q signal values; and
a phase correction module configured to derive from the received IQ signal values a correction signal and apply the correction signal to the phase rotator in a path of the local oscillator.

2. The apparatus as recited in claim 1, further comprising an adjustment mechanism to enable adjustment of the phase of the phase rotator by an automatic circuit.

3. The apparatus as recited in claim 1, further comprising an adjustment mechanism to enable adjustment of the phase of the phase rotator by an external interface.

4. The apparatus as recited in claim 1 wherein the phase rotator controls a phase of an intermediate-frequency (IF) local-oscillator signal in a multiple-conversion radio architecture.

5. The apparatus as recited in claim 4, wherein the phase rotator includes a single phase rotator employed at a multiple of the IF frequency and an output of the phase rotator is divided by the multiple to generate local oscillation drive for a quadrature down-converter.

6. The apparatus as recited in claim 4, wherein the phase rotator includes first and second phase rotators employed at the IF frequency wherein the first phase rotator is used to drive In-phase down-conversion and the second rotator is used to drive Quadrature-phase down-conversion.

7. The apparatus as recited in claim 4, wherein the phase rotator is employed at the IF frequency and the output of the phase rotator is sent through a quadrature generation network to generate the local oscillator signals for a quadrature down-converter.

8. The apparatus as recited in claim 1, wherein the apparatus is included on an integrated circuit chip.

9. The apparatus as recited in claim 8, wherein the phase rotator device connects to a receiver down-converter and the phase rotator is automatically controlled by on chip processing logic to realize a carrier recovery function.

10. The apparatus as recited in claim 8, wherein the phase rotator is controlled by off-chip processing logic through an interface bus to control phase.

11. The apparatus as recited in claim 8, wherein the chip includes a receiver portion and a transmitter portion, and the phase rotator is controlled by off-chip processing logic to independently control a receiver signal phase and transmitter signal phase.

12. The apparatus as recited in claim 8, wherein phase correction signals are derived from a sign of I, a sign of Q, and a sign of (I+Q) and (I−Q) signals as output from a quadrature down-converter.

13. The apparatus as recited in claim 1, wherein the apparatus is on an integrated circuit chip and the phase correction signal is sent to on-chip processing logic to develop phase correction values automatically on-chip.

14. The apparatus as recited in claim 1, wherein the apparatus is on an integrated circuit chip and the phase correction signal is brought to an off-chip bus, which may be clocked and read by an external controller device to develop phase correction signals which are communicated back onto the chip through an external interface.

15. The apparatus as recited in claim 1, wherein the phase rotator includes an analog phase rotator configured to control a homodyne frequency in a direct-conversion radio architecture.

16. The apparatus as recited in claim 1, wherein the phase correction module module comprises four 1-bit analog-to-digital converters, each of which receives a respective one of the signals I, Q, (I−Q), and (I+Q) and determines a corresponding sign for said signal.

17. The apparatus as recited in claim 1, wherein the digitally controlled analog phase rotator accepts a digital input phase value to determine differential-pair tail current weights to provide a phase control from 0 to 360 degrees.

18. The apparatus as recited in claim 1, wherein each differential input is connected to two differential pairs whose outputs are summed together.

19. An apparatus to control phase of signals in a radio comprising:
a transceiver configured to receive radio signals, the transceiver comprising:
a low frequency oscillator which receives radio frequency signals and outputs an intermediate frequency (IF) signal;
a quadrature generation network configured to output in-phase (I) and quadrature (Q) phase;
a digitally controlled analog phase rotator, driven by the local oscillator, which receives differential I and Q inputs that are output from the quadrature generation network, connected in two differential pairs, and controls a phase of the local oscillator's output, wherein there is no digital-to-analog converter in a path of the analog phase rotator and the local oscillator;
a phase error determination module configured to determine phase error information based on received IQ signal values; and
a phase correction module configured to derive from the received IQ signal values a correction signal and apply the correction signal to the phase rotator in a path of the local oscillator.

20. The apparatus as recited in claim 19, further comprising an adjustment mechanism to enable adjustment of the phase of the phase rotator by an automatic circuit.

21. The apparatus as recited in claim 19, further comprising an adjustment mechanism to enable adjustment of the phase of the phase rotator by an external interface.

22. The apparatus as recited in claim 19, wherein the phase rotator controls a phase of an intermediate-frequency (IF) local-oscillator signal in a multiple-conversion radio architecture.

23. The apparatus as recited in claim 22, wherein the phase rotator includes a single phase rotator employed at a multiple of the IF frequency and an output of the phase rotator is divided by the multiple to generate local oscillation drive for a quadrature down-converter.

24. The apparatus as recited in claim 22, wherein the phase rotator includes first and second phase rotators employed at the IF frequency wherein the first phase rotator is used to drive In-phase down-conversion and the second rotator is used to drive Quadrature-phase down-conversion.

25. The apparatus as recited in claim 19, wherein the phase rotator is employed at the IF frequency and the output of the phase rotator is sent through the quadrature generation network to generate the local oscillator signals for a quadrature down-converter.

26. The apparatus as recited in claim 19, wherein the phase rotator device connects to a receiver down-converter and the phase rotator is automatically controlled by on chip processing logic to realize a carrier recovery function.

27. The apparatus as recited in claim 19, wherein the phase rotator is controlled by off-chip processing logic through an interface bus to control phase.

28. The apparatus as recited in claim 19, wherein a chip includes a receiver portion and a transmitter portion, and the phase rotator is controlled by off-chip processing logic to independently control a receiver signal phase and transmitter signal phase.

29. The apparatus as recited in claim 19, wherein phase correction signals are derived from a sign of I, a sign of Q, and a sign of (I+Q) and (I−Q) signals as output from a quadrature down-converter.

30. The apparatus as recited in claim 19, wherein the apparatus is on an integrated circuit chip and the phase correction signal is sent to on-chip processing logic to develop phase correction values automatically on-chip.

31. The apparatus as recited in claim 19, wherein the apparatus is on an integrated circuit chip and the phase correction signal is brought to an off-chip bus, which may be clocked and read by an external controller device to develop phase correction signals which are communicated back onto the chip through an external interface.

32. A method for controlling phase in a radio device comprising:
controlling phase of a local oscillator's output in a radio device using a digitally controlled analog phase rotator that accepts differential in-phase (I) and quadrature (Q) (IQ) inputs, connected in two differential pairs, wherein there is no digital-to-analog converter in a path of the analog phase rotator and the local oscillator;
enabling adjustment of the phase of the phase rotator by one or more of an automatic circuit or an external interface;
determining phase error information based on received I and Q phase signal values; and
applying a phase correction signal derived from the received IQ signal values to the analog phase rotator device that is driven by a local oscillator of the radio device.

33. The method as recited in claim 32, wherein applying includes automatically controlling the phase rotator by on-chip processing logic to realize a carrier recovery function in a receiver down-converter.

34. The method as recited in claim 32, wherein the applying includes controlling the phase rotator by off-chip processing logic through an interface bus to control receiver signal phase and/or transmitter signal phase, wherein the receiver and transmit phase may be controlled independently.

35. The method as recited in claim 32, wherein the determining includes deriving receiver phase correction signals from a sign of I, a sign of received Q, and a sign of (I+Q) and (I−Q) signals as output from a quadrature down-converter.

* * * * *